Dec. 23, 1924.　　　　　　　　　　　　　　　　　　　　1,520,513
N. SANDOR
EGG CONTAINER
Filed Dec. 27, 1920　　2 Sheets-Sheet 2

Witness
Edwin L. Bradford

Inventor
NICHOLAS SANDOR
By Church & Church
Attorneys

Patented Dec. 23, 1924.

1,520,513

UNITED STATES PATENT OFFICE.

NICHOLAS SANDOR, OF DRESDEN, GERMANY.

EGG CONTAINER.

Application filed December 27, 1920. Serial No. 433,333.

*To all whom it may concern:*

Be it known that I, NICHOLAS SANDOR, a citizen of the Republic of Hungary, residing at Dresden, Saxony, Germany, have invented certain new and useful Improvements in Egg Containers; and I do hereby declare the following to be a full, clear, and exact description of the same, reference being had to the accompanying drawings, forming part of this specification.

This invention relates to a crate for the shipment of eggs and has for its principal object the provision of a simple and light container that will hold a maximum number of eggs without material liability to breakage in the ordinary course of transit.

A further object of the invention lies in the provision of an egg-holding crate consisting of a plurality of egg-holding trays each of which is supported by engagement of a series of eggs below the sheet, and itself furnishes a support for a similar series of eggs below while providing lateral support for an additional series of eggs centrally located with respect to the tray.

An egg by virtue of its shape can withstand a considerable pressure in the direction of its length provided that such pressure is applied evenly all around a circle on its surface located in a plane at right angles to the major axis. The system of packing eggs disclosed in the present application is based upon this law and utilizes means for holding all of the eggs in an upright position, each egg resting upon one sheet, being laterally held about centrally of a second sheet immediately above and having its point extending slightly through a third sheet, the eggs being held at the top by slightly bent springy radial tongues and held in the center by slightly shorter radial tongues which are bent, however, to a considerable angle, although the upper and lower tongues are bent but slightly.

It will be seen that a considerable number of the egg-holding sheets may be placed one above the other without danger, since in the construction illustrated, the pressure is transmitted by these series of elastic radial tongues firmly gripping the tops, middles and bottoms of the eggs in a complete circle in each case, and since each sheet is supported from below by engagement with other eggs, it is practically impossible to crack an egg in the crate if the usual care in handling articles of this nature is given.

In the drawings,—

Figure 1:
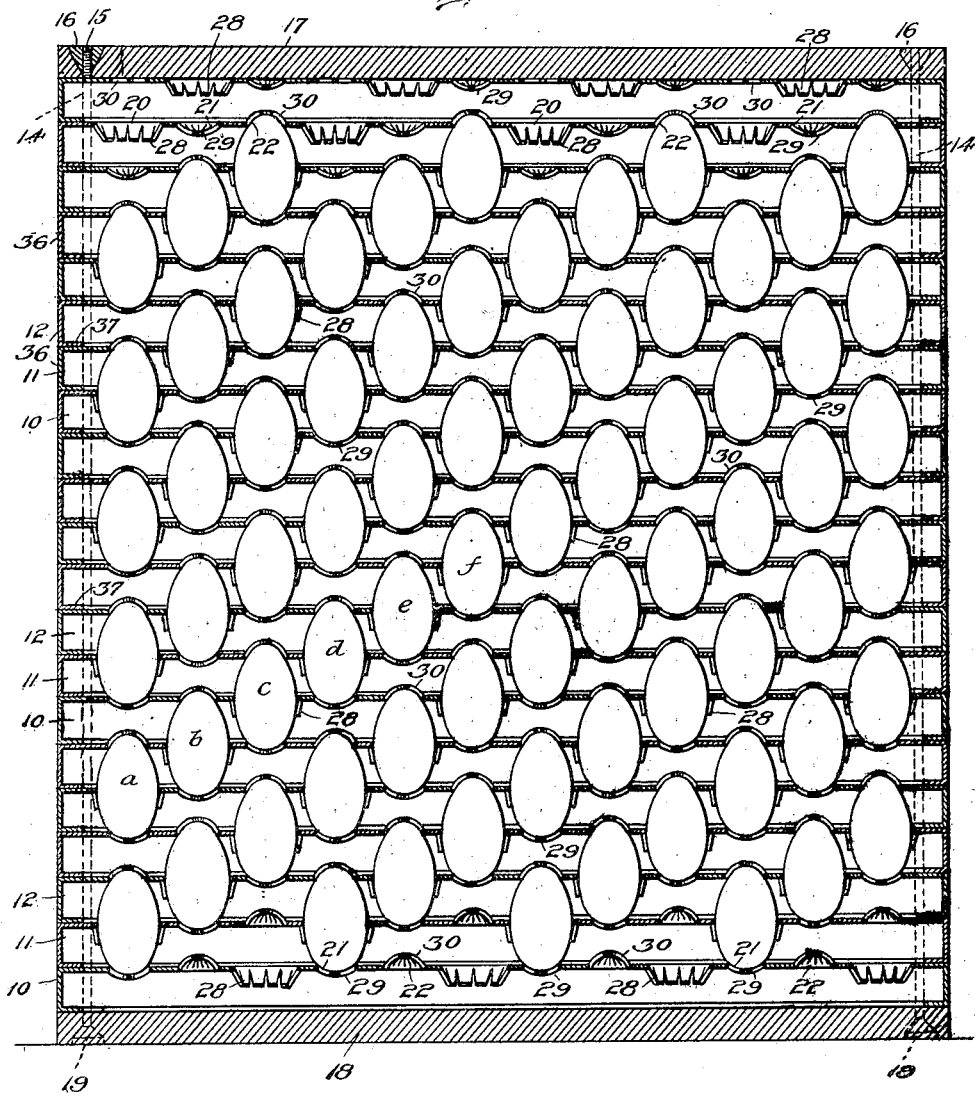
Figure 1 is a vertical section through a crate embodying the features of the present invention.
Figure 2:
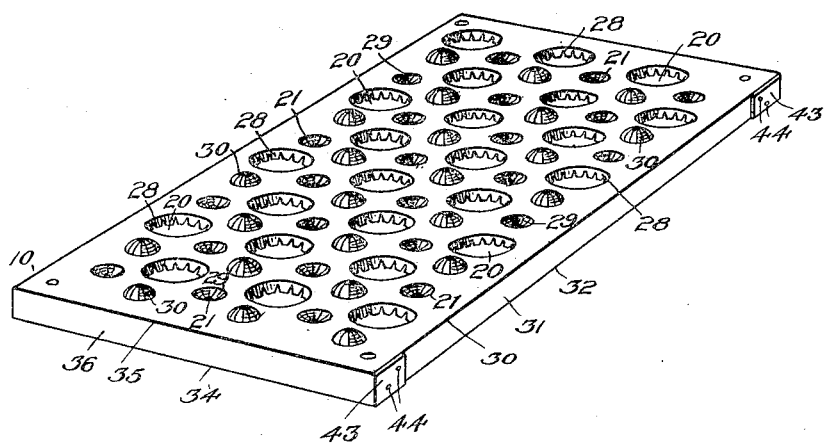
Fig. 2 is a perspective view of one of the trays.

My crate includes a plurality of trays 10, 11 and 12, quite similar except in the location of the various holes and is intended to be assembled by means of the four rods 14 each threaded at the top end as at 15 to receive a conical nut 16 countersunk into the top lid 17 while the bottom board or base 18 is engaged by the countersunk head 19, these boards being preferably made of substantial planking and reinforced in the usual manner with cleats if so desired.

The trays 10, 11 and 12 consist preferably of a single sheet of flexible material, such for example as the three-ply composition board made of thin veneers of wood arranged so that the grain of the wood in each of the three plies runs in opposite directions, preferably at an angle of 120° to each other. If desired the trays may be made of ordinary card board, pasteboard, or any other elastic material sufficiently strong to support the eggs and to frictionally engage the same sufficiently to hold them in vertical position, but the composition board described is much superior in strength and length of service.

Figure 3:
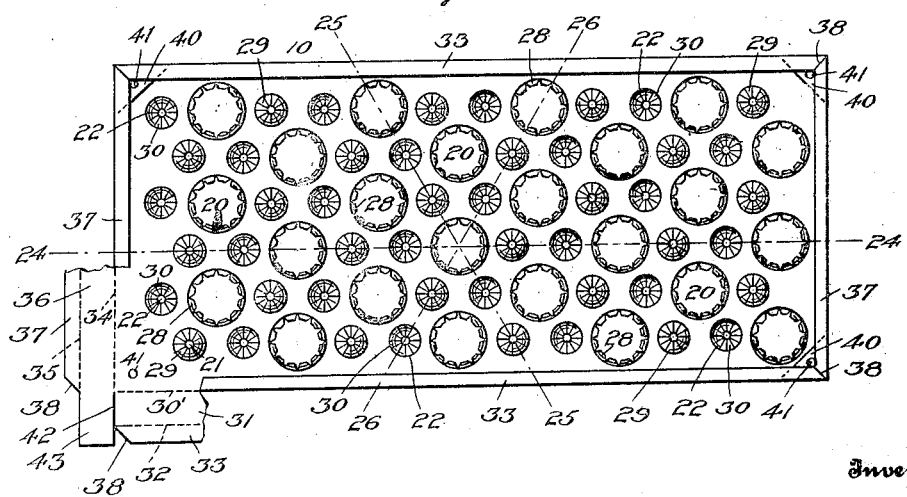
Fig. 3 is a bottom plan view of a cooperating tray.

The flat portion of each tray is perforated by a series of holes 20, 21 and 22, arranged in parallel longitudinal rows and so spaced that additional rows arranged at angles of 60° to each other will be formed as indicated by the dot and dash lines 24, 25 and 26 of Fig. 3, such lines crossing in the center of one of the holes 20 which it will be noted are of considerably larger size than the surrounding holes 21 and 22, which are themselves of the same size. The material around each of the holes 20, 21 and 22 is radially slit to form resilient tongues 28, 29 and 30, respectively, preferably twelve in number, in each case, the tongues 28 being extended downwardly to a considerable angle while the tongues 29 and 30 are bent but slightly, the former being depressed downwardly, while the tongues 30 are pressed upwardly to receive the pointed end of the egg. The tongues 30 may be slightly shorter in length than the tongues 29, since they engage the points of the eggs while the latter engage the nearly semispherical bottoms of the eggs, although as will be understood, this is purely a matter of choice and both top and bottom holes may be made of exactly the same size if desired.

The margins of the sheets or trays are bent downwardly along the line 30' to form side flanges 31 and again at 32 to form inwardly directing strengthening lips 33 arranged parallel with the main portion of the sheet 13. The sheets are also bent as at 34 and 35 to form end flanges 36 and strengthening lips 37 similar to the lips 33 and like them beveled at each corner as at 38 to prevent the forming of double thicknesses where these lips 33 and 36 engage the wooden triangular corner blocks 40 perforated as at 41 to receive the rods 14. The sheets 13 are slit as at 42 to form short tongues 43 which overlap the side flanges 31 at each corner and receive the nail or other fastening means 44 for securing the sheet to the corner piece 40.

Referring now particularly to Figure 1, it will be noted that the eggs are packed in vertically rising series, such as $a$, $b$, $c$, $d$, $e$, $f$, etc., and that the perforations reading from left to right on tray 10, for example, are bottom, top, middle, bottom,—bottom, top, middle, etc.; and on the tray 11, just above, the series runs middle, bottom, top,—middle, bottom, top; and in tray 12 the series will be top, middle, bottom,—top, middle, bottom. The object of this arrangement is to provide for the packing of the greatest possible number of eggs in the given cubical space of the crate. On referring to Figure 3 it will be noted that the different holes vary periodically from end to end and in addition in lines at an angle of 60° on either side of the longitudinal rows, but that in the transverse rows, that is, the rows running the short way of the container all of the holes are similar but the rows in turn periodically alternate middle, bottom, top,—middle, bottom, top. Each egg, such as $a$, for example, rests with its butt or bottom in one of the depressions formed by the hole 21 and the slits, is laterally held by the tongues 28 of the tray immediately above and has its top or point extending slightly through the hole 22 forcing the tongues 30 slightly upwardly and a sufficient amount so that the weight of each tray may be entirely supported by its engagement with the points of the horizontal series of eggs centrally held by the next lower tray. It has been found advantageous, however, not to rely upon this method of holding the trays but to have the corner pieces 40 of such thickness as to position the eggs in the manner shown in Figure 1, these corner pieces 40 then forming a practically integral substantial corner reinforcement of the crate by virtue of the binding action of the four tension rods 14 which firmly holds all of the trays in place.

While the sheets of material may be slitted without bending the fingers it has been found preferable to form the sheet during the slitting and bending operations and to remove part of the material in the center of each set of slits forming the middle engaging tongues leaving an appreciable sized hole or perforation. These middle engaging tongues are bent by the forming press downwardly to an angle of about sixty degrees or more and the other sets of tongues are raised or depressed to form domes or depressions to receive the points and butts respectively of the eggs. When the composition board is dried after the slitting and forming operations it will hold its shape well at the flanges and lips but the tongues will be sufficiently flexible to readily receive eggs of any of the usual sizes but yet firm enough to materially aid in supporting the trays above.

What is claimed is:

1. An egg crate including a plurality of trays having resilient tongues to engage and support the eggs, characterized by the provision that when the crate is assembled, said tongues in vertical rows alternately engage in periodical succession, the bottoms, middles, and points of the eggs.

2. An egg crate including a plurality of trays having resilient tongues to engage and support the eggs, characterized by the provision that when the crate is assembled, said tongues in horizontal rows alternately engage in periodical succession, the bottoms, middles, and points of the eggs.

3. An egg crate including a plurality of trays having resilient tongues to engage and support the eggs, characterized by the provision that when the crate is assembled, said tongues in horizontal and vertical rows alternately engage in periodical succession, the bottoms, middles, and points of the eggs.

4. An egg crate including a plurality of trays having resilient tongues to engage and support the eggs, characterized by the provision that when the crate is assembled, each tray flexibly supports a number of eggs by engagement with their bottoms, flexibly positions an equal number of eggs by their points, and in addition laterally supports a similar number of eggs by engagement with their middle portions.

5. In an egg container, a plurality of members spaced apart and disposed parallel to one another and between which eggs are placed, one of said members forming an elastic support upon which the eggs rest and another of said supports being supplied with resilient portions furnishing a circular series of lateral supports for engaging the middle portion of the eggs.

6. In an egg container, a plurality of members spaced apart and disposed parallel to one another and adapted to receive eggs, one of said members forming an elastic support for a number of eggs, and a second member resiliently supported by said eggs and in turn furnishing a yielding support for an additional number of eggs, the eggs supported by the second member being spaced to the side of the eggs supporting said member.

7. A tray for an egg container characterized by the provision of resilient tongues adapted to engage alternately in parallel rows the middles, bottoms and tops, respectively, of the eggs.

8. A tray for an egg container provided with a plurality of sets of resilient tongues, said sets of tongues being arranged in series of sevens, the central set of tongues of each of said series being adapted to receive and support the central portion of an egg while the six surrounding sets of tongues receive alternately the bottoms and tops, respectively, of other eggs.

9. An egg crate tray provided with a plurality of perforations bounded by resilient fingers, said tray being supported by engagement with the points of a series of eggs below said tray, supporting other eggs at their middle portions, and furnishing a flexible support for a third series of eggs.

10. A tray for an egg crate consisting of a generally flat sheet of resilient material bent downwardly to form side and end flanges and provided throughout the flat portion thereof with a series of holes each bounded by resilient fingers, said fingers being adapted to receive alternately the middles, bottoms, and tops, respectively, of said eggs, said series running in each of three different directions arranged at angles of 120° from each other.

11. A tray for an egg crate perforated with a number of holes each bounded by a plurality of flexible tongues, said tongues in transverse parallel rows being similar and alternating from end to end to receive the middles, tops and bottoms, respectively, of the eggs packed in said crate.

12. An egg crate including a plurality of trays characterized by the engagement of each egg with three of said trays.

NICHOLAS SANDOR.